United States Patent [19]
Herold

[11] Patent Number: 5,832,067
[45] Date of Patent: Nov. 3, 1998

[54] METHOD AND APPARATUS FOR INTEGRATING TELEPHONE SIGNALS WITH AN ALARM CLOCK

[76] Inventor: John Patrick Herold, 3288 Breton Cir., Atlanta, Ga. 30319

[21] Appl. No.: 533,351

[22] Filed: Sep. 22, 1995

[51] Int. Cl.⁶ .................................................. H04M 11/00
[52] U.S. Cl. ................................... 379/110.01; 379/93.25
[58] Field of Search ............................... 379/110, 90, 93, 379/96–105, 457

[56] References Cited

U.S. PATENT DOCUMENTS

| | | |
|---|---|---|
| 4,356,509 | 10/1982 | Skerlos et al. . |
| 4,481,382 | 11/1984 | Villa-Real ............................... 379/101 |
| 4,653,087 | 3/1987 | Galich . |
| 5,233,646 | 8/1993 | Kuromi . |
| 5,317,626 | 5/1994 | Jaynes et al. . |
| 5,369,689 | 11/1994 | Kawamura ............................ 379/100 |
| 5,373,488 | 12/1994 | Lidor ...................................... 379/110 |

FOREIGN PATENT DOCUMENTS

| | | | |
|---|---|---|---|
| WO95/04426 | 2/1995 | WIPO ..................................... 379/93 |

*Primary Examiner*—Wing F. Chan
*Attorney, Agent, or Firm*—Needle & Rosenberg, P.C.

[57] ABSTRACT

A method and apparatus for transferring information received from a server that is operationally coupled to a telephone line, comprising an alarm signal generating circuit which generates an alarm signal at a selected time. A circuit, which is responsive to the alarm signal and operatively coupled to the telephone line, transmits selected information to the server. A circuit selects a message for sending by the server from a plurality of messages based upon the information transmitted to the server. A circuit that is operatively coupled to the telephone line presents to the user the selected message received from the server. In an alternative embodiment, a set of data is selected for sending by the server from a plurality of sets of data based upon the information transmitted to the server. A microprocessor having a digital memory, operatively coupled to the telephone line, stores the set of data received from the server. Such data may be used to control mechanical devices.

22 Claims, 4 Drawing Sheets

METHOD AND APPARATUS FOR INTEGRATING TELEPHONE SIGNALS WITH AN ALARM CLOCK

REFERENCE TO MATERIAL SUBJECT TO COPYRIGHT PROTECTION

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyrights whatsoever.

1. Field of the Invention

The present invention relates to telecommunications devices, and, more particularly, to a device that integrates signals from a telephone line with an alarm clock.

2. Description of the Prior Art

Radio alarm clocks have been known to the art for many years. They allow a user to be awakened by either an alarm or the sound of a radio. When using an alarm clock in the radio mode, the user has the ability to select the type of radio station he wants to be awakened to, but he has no control over what, exactly, is played. For example, he could tune the radio to a station that plays mainly weather forecasts, but he has no control over what region of the world for which a forecast is being broadcast at the time he intends to wake up.

Telephone answering services are also known to the art. They typically awaken the user with the ringing of the telephone and then deliver a short message, such as "good morning, this is your wake-up call." Again, the user has little control over the message being played.

The prior art does not disclose a device that connects an alarm clock to a server via a telephone line, thereby allowing a user to preselect messages to be played at a preselected time.

SUMMARY OF THE INVENTION

The disadvantages of the prior art are overcome by the present invention, which comprises an apparatus for transferring information received from a server that is operationally coupled to a telephone line. An alarm signal generating circuit generates an alarm signal at a selected time. A circuit, which is responsive to the alarm signal and operatively coupled to the telephone line, transmits selected information to the server. A circuit selects a message for sending by the server from a plurality of messages based upon the information transmitted to the server. A circuit that is operatively coupled to the telephone line presents to the user the selected message received from the server.

Another aspect of the present invention is a method of presenting a message from a server on an alarm clock, having an associated output device, connectable to the server by a telephone line. The alarm clock is set to generate an alarm signal at a selected time. A message is selected to be presented upon activation of the alarm signal. The server is dialed when the alarm signal is generated by the alarm clock. Selected information is transmitted over the telephone line to the server. The selected message is transmitted from the server to the alarm clock over the telephone line based on the selected information transmitted to the server and the selected message is presented over the output device.

Another aspect of the present invention is an apparatus for presenting a message received from a server that is operationally coupled to a telephone line. A circuit is provided for selecting a time at which an alarm signal is to be activated. An alarm clock generates the alarm signal at the selected time. A telephone dialer circuit, operationally coupled to the telephone line, then dials a selected telephone number upon sensing the alarm signal, thereby creating a connection on the telephone line. A remote server stores a plurality of stored messages. A switch, disposed on the alarm clock, has a plurality of user-selectable states, each state corresponding to a type of message that a user would desire to have played upon the generation of the alarm signal. An information transfer circuit transfers a selected state from the switch to the telephone line in a format compatible with the server, thereby requesting the server to play a message of a selected type from a plurality of stored messages. An audio amplifier, operationally coupled to the telephone line, generates an amplified signal corresponding to the message received from the server. A speaker, operationally coupled to the audio amplifier, generates sound corresponding to the amplified signal, thereby playing the message to the user.

Yet another aspect of the present invention is an apparatus for transferring information received from a server that is operationally coupled to a telephone line. A circuit generates an alarm signal at a selected time. A circuit, responsive to the alarm signal and operatively coupled to the telephone line, transmits selected information to the server and a circuit selects a set of data for sending by the server from a plurality of sets of data based upon the information transmitted to the server. A microprocessor having a digital memory, operatively coupled to the telephone line, stores the set of data received from the server.

An advantage of the present invention is that it allows a user to receive a message from a server at a preselected time.

A further advantage is that it allows the message to be selected based on information supplied to the server.

A further advantage is that it allows a user to receive data from a server at a preselected time based on information supplied to the server.

These and other advantages will become apparent from the following description of the preferred embodiment taken in conjunction with the following drawings, although variations and modifications may be effected without departing from the spirit and scope of the novel concepts of the disclosure.

DETAILED DESCRIPTION OF ILLUSTRATIVE EMBODIMENTS OF THE INVENTION

Figure 1:
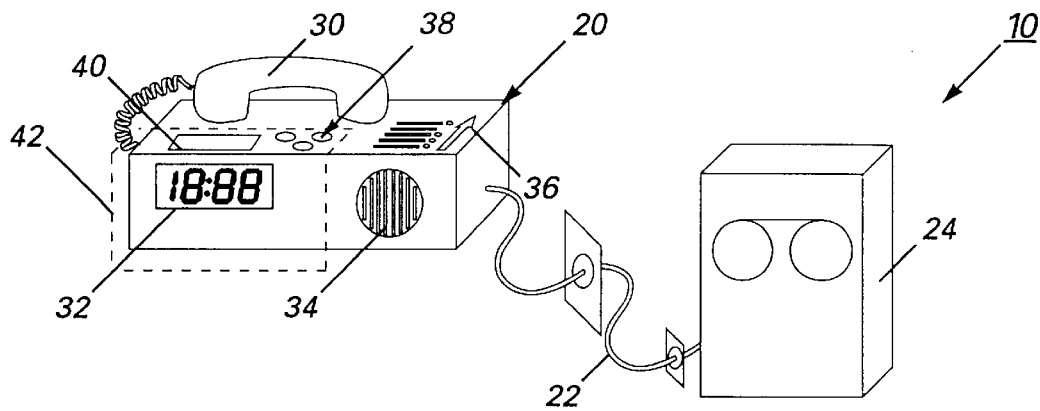
FIG. 1 is a perspective view of a first embodiment of the present invention.

A preferred embodiment of the invention is now described in detail. Referring to the drawings, like numbers indicate like parts throughout the views. As used in the description herein and throughout the claims that follow, "a," "an," and "the" includes plural reference unless the context clearly dictates otherwise. Also, as used in the description herein and throughout the claims that follow, the meaning of "in" includes "in" and "on" unless the context clearly dictates otherwise.

As shown in FIG. 1, the present invention 10 comprises an integrated telephone-alarm clock apparatus 20 connectable via a telephone line 22 to a server 24. The server 24 could be a digital computer or any type of device capable of receiving information from a the telephone line 22 and selecting a message (which could include an analog signal, digital data, or both) from a plurality of messages, based upon information transmitted to it. The apparatus 20 transmits selected information to the server 24, which selects a message based on the selected information and then transmits the message to the apparatus 20. The integrated telephone-alarm clock apparatus 20 comprises a telephone handset 30 and an alarm clock 42 having a clock display 32 (which could be part of either a digital alarm clock, an analog alarm clock or a display directly coupled to a digital time-keeping device). The apparatus 20 also comprises a speaker 34 which presents to the user a selected message received from the server 24.

A plurality of control inputs 38 control the operation of the apparatus 20. For example, one input could be used to activate the apparatus 20, while another input could be used to set an alarm on the alarm clock 42. Yet another input could be used to select the playing of music directly from a radio. Such inputs could comprise discrete button-type switches or a single multi-position switch, or any other conventional signal input device. A delay input device 40, such as the snooze-bar of the alarm clock 42, provides delay inputs to the apparatus 20 to cause the delay of message playback.

Although apparatus 20 is shown as a hand set 30 integrated with an alarm clock 42, the hand set 30 could be completely separate from the alarm clock 42. In fact, as would be obvious to one skilled in the art, the alarm clock 42 and the hand set 30 could be discrete components that are separate from, yet coupled to, the apparatus 20.

In operation, a user sets the alarm clock 42 to generate an alarm signal at a selected time. The user also selects a message to be presented upon activation of the alarm signal by adjusting a message selection switch 36. The switch 36 could be either a mechanical-electrical slide switch or an electronic switch (or any other conventional means for inputting selected information). When the alarm signal is generated by the alarm clock 42, the apparatus 20 dials the server 24 and transmits selected information (such as the state of switch 36, caller ID information and the dialing telephone number) over the telephone line 22 to the server 24. The server 24 selects a message based on the selected information transmitted thereto (including the message type indicated by switch 36 and the location of the user, as indicated by caller ID information) and then transmits the selected message to the alarm clock 42 over the telephone line 22. Examples of message types that could be played include sports information, weather forecasts, stock quotes, news, or any other type of updatable information a user would be interested in periodically hearing. The selected message is then presented to the user over an output device, such as the speaker 34. Upon playing of the message, the user may input a delay signal to the alarm clock 42 by depressing the snooze bar 40, thus causing the delaying of the playing of the message for a predetermined period.

Figure 2:
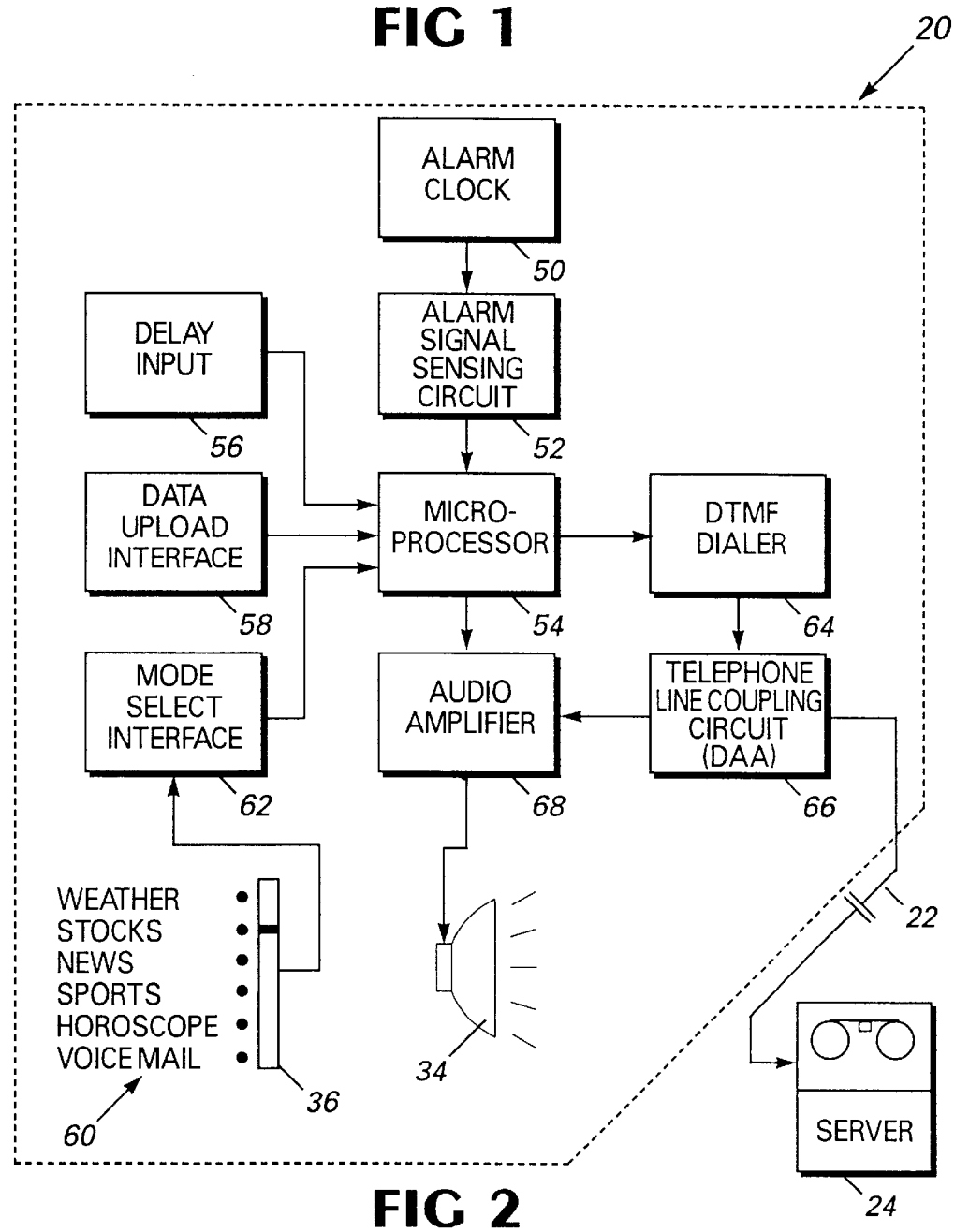
FIG. 2 is a block diagram of a first embodiment of the present invention.

In one preferred embodiment shown in FIG. 2, the apparatus 20 comprises a standard digital alarm clock 50 that is capable of generating an analog alarm signal. An alarm sensing circuit 52 transforms the analog alarm signal into a digital signal, which is supplied to a microprocessor 54. As would be obvious to one skilled in the art, any standard microprocessor (such as a 4-bit microprocessor) could be used. Preferably, the microprocessor 54 has DTMF (telephone dial signal) generating capability. In one illustrative embodiment, the microprocessor 54 was an embedded processor on a HyperCore card from The Silverthorn Group, Inc., Brinklow, Md.

The microprocessor 54 receives information regarding the desired message from a mode select interface 62, which transforms signal input from switch 36 to a suitable digital format. Switch 36 has a plurality of states 60 that indicate the type of message the user is interested in hearing upon the alarm going off. As shown in this example, the user has set the switch 36 so that stock information will be played by the apparatus 20.

Upon receipt of a digital alarm signal from the alarm sensing unit 52, the microprocessor 54 sends an activating signal and a telephone number of a server to a DTMF dialer circuit 64. The DTMF dialer circuit 64 is coupled to the telephone line 22 through a telephone line coupling circuit 66 (such as a standard Data Access Arrangement) and generates DTMF tones corresponding to the telephone number, thereby creating a connection with the server 24.

In one preferred embodiment, the present invention could comprise a single server 24 having one phone number and storing several messages, the selection of which is made based on information transmitted to the server 24. In another preferred embodiment, the present invention could comprise several servers 24, each capable of transmitting a single message and each having its own telephone number; the selection of the message played being determined by the telephone number dialed.

The telephone line coupling circuit 66 also receives the message transmitted from the server 24 and passes it to an audio amplifier 68. The audio amplifier 68, which receives an activation signal from the microprocessor 54, amplifies the message and sends an amplified signal to the speaker 34, which presents the message to the user.

If the user presses the snooze bar, a delay input 56 sends a signal to the microprocessor 54, which causes the telephone line coupling circuit 66 to disconnect from the server 24. The microprocessor 54 then either waits for a predetermined period, which it counts off internally, or it waits for a regeneration of the alarm signal, and then it causes the telephone line coupling circuit 66 to redial the telephone number of the server 24 and repeats the above-described process.

A data upload interface 58 (such as a serial port, an RS-232 port or any interface obvious to one skilled in the art) may be provided to input information, such as server telephone numbers, code upgrades, etc., to the microprocessor 54.

Figure 3A:
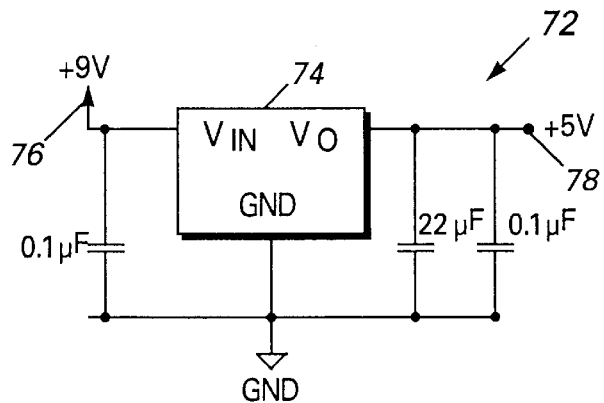
FIG. 3A is a schematic diagram of the voltage regulator employed in the present invention.
Figure 3B:
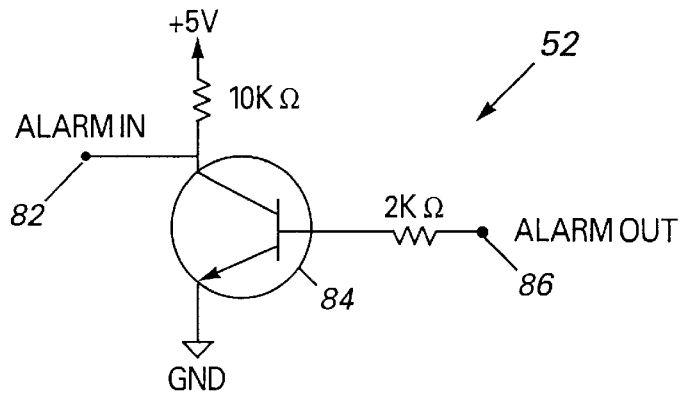
FIG. 3B is a schematic diagram of the alarm detect circuit employed in the present invention.
Figure 3C:
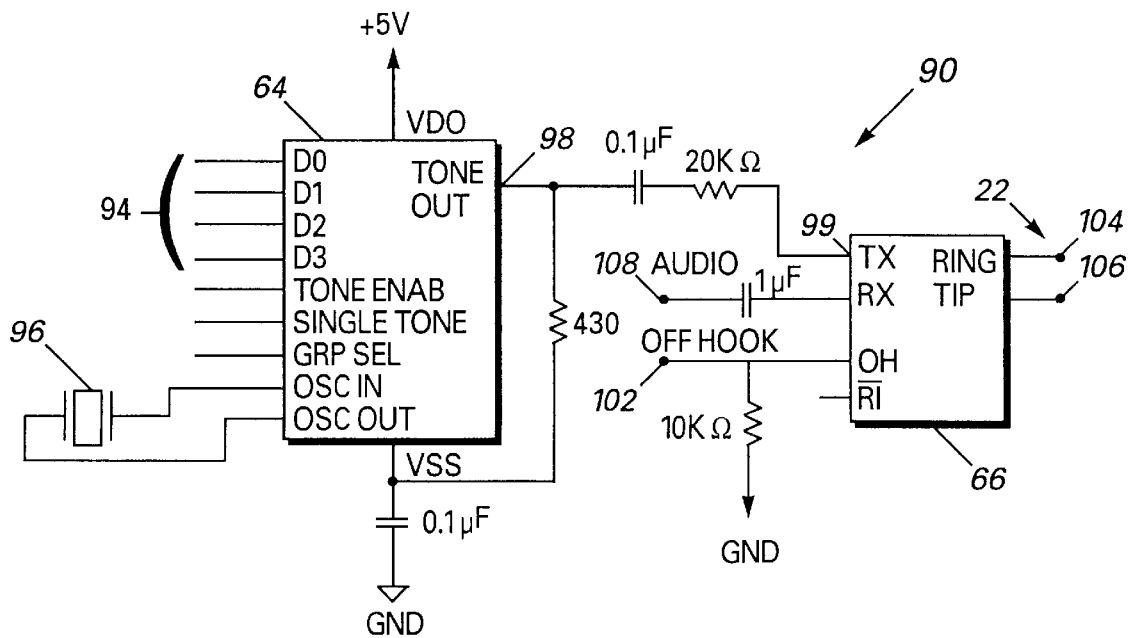
FIG. 3C is a schematic diagram of the DTME dialer circuit and the telephone line coupling circuit employed in the present invention.

As shown in FIG. 3A, power is supplied to the apparatus 20 with a voltage regulation circuit 72 that transforms the 9 V power supply 76 from the alarm clock to a 5 V power supply 78. The voltage regulation circuit 72 of this embodiment employs a voltage regulator 74 such as an LM340LAZ-5.0 regulator. FIG. 3B shows an embodiment of the alarm sensing circuit 52. In this embodiment, the analog alarm signal from the alarm clock 42 is coupled to the collector of a bipolar junction transistor 84, the gate of which supplies the digital alarm signal 86 to the microprocessor 54. Also, a backup power supply voltage could be supplied to the alarm clock's counter from the phone line, if such usage meets with the phone company's power usage regulations. FIG. 3C shows an embodiment 90 of the DTMF dialer 64 coupled to the telephone line coupling circuit 66. The DTMF dialer 64 in this embodiment 90 comprises a TP508SWM SOIC14 integrated circuit dialer coupled to a 3.579545 MHz At-cut oscillator 96 and a XE0052SIP DAA chip 66. The dialer 64 has four DTME inputs 94, upon which the telephone number to be dialed is placed, and a tone out signal 98 that caries the DTME tones to the DAA 66. The DAA 66 receives the DTME tones at its TX input 99 and, upon receiving an off-hook indication signal 102, places the DTMF tones on the tip line 106 of the telephone line 22. The message from the server 24 is received on the ring line 106 by the DAA 66 and the signal is passed onto the apparatus 20 through the RX output 108 of the DAA 66. As would be obvious to one skilled in the art, many other embodiments of the above-described circuits could be employed without departing from the scope of the invention.

This embodiment of the present invention contemplates operation in at least two modes: a "900 mode," corresponding to the invention being used in places that allow the dialing of 1-900 numbers (such as at home), and an "800 mode," corresponding to the invention being used in places that do not allow the dialing of 1-900 telephone numbers (such as in hotels). When in the 900 mode, the server automatically charges the user for use of the server and any charges for the service are applied to the user's telephone bill. When in the 800 mode, a billing account number must be transmitted to the server and any charges for the service are either applied to one of the user's credit cards, or are directly billed to the user.

Figure 4:
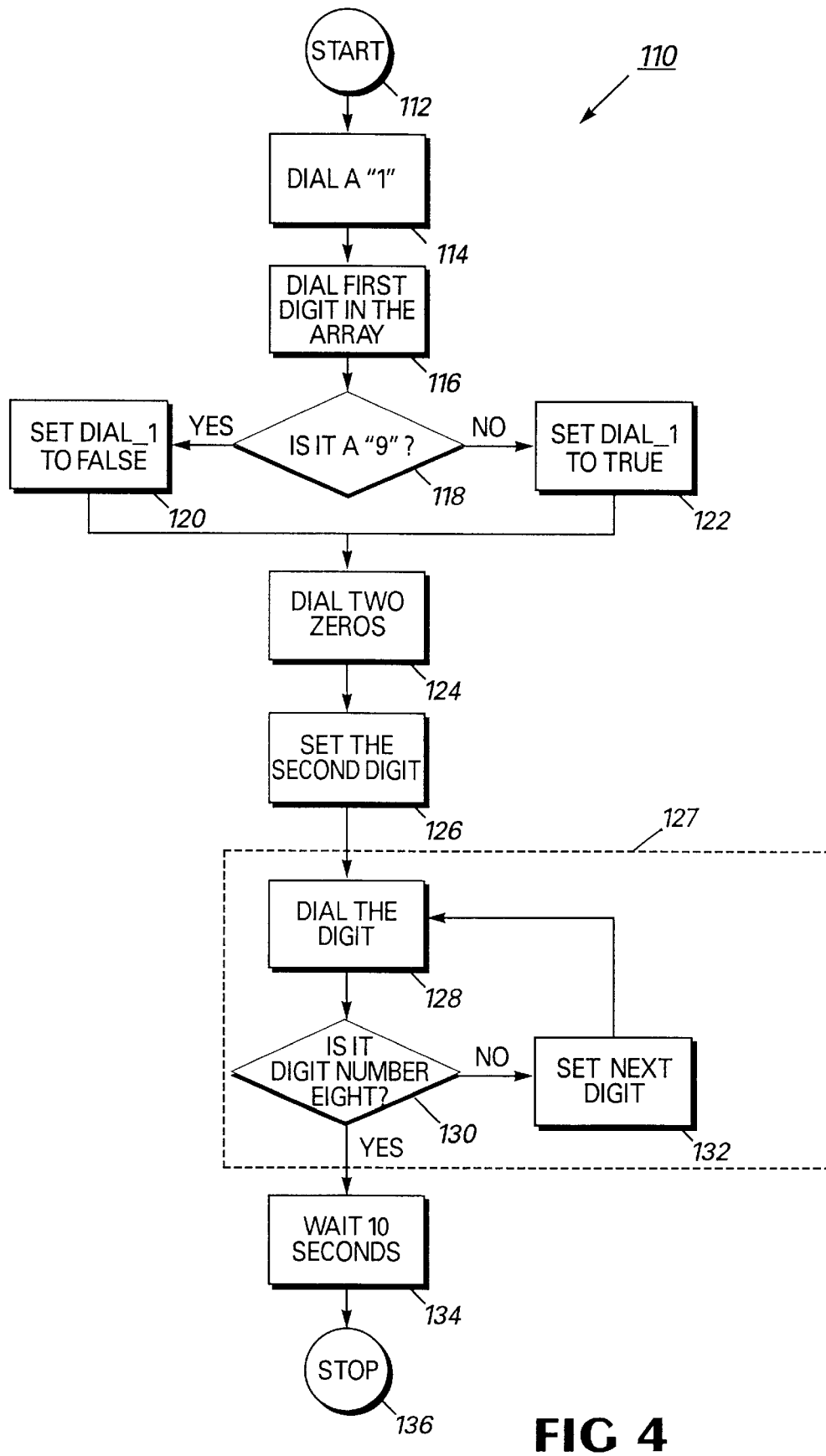
FIG. 4 is a flow chart of a program used by the present invention.

FIG. 4 shows a flow chart corresponding to the dialing portion 110 of the program (an ANSI C version of this program is disclosed in more detail in the Appendix) used to drive the microprocessor 54. Prior to dialing, the program is idle and enters a start state 112. It performs an operation 114 that dials a "1" and then performs an operation 116 that dials the first digit of a number stored in an array. A test 118 is performed to determine if the first digit is a "9." If the first digit is a "9," an operation 120 sets a "800" number flag to "false," otherwise an operation 122 sets the flag to "true." (The "800" number flag is used to cause customer account information to be placed on the system when the customer is using the device in the "800 mode.") Next, an operation 124 dials two zeros and then an operation 126 sets the digit immediately after the zeros onto the dialer.

The program then enters a loop 127 in which an operation 128 is performed that dials the currently held digit, a test 130 is performed to determine is the last digit has been dialed, and if not, an operation 132 is performed that sets the next digit into the dialer, control is then returned to operation 128. If the result of test 130 is that the last digit has been dialed, then the program exits the loop 127 and performs an operation 134 that waits ten seconds (this allows the connection to be established and the message to begin playing before the audio amplifier is activated). The dialing portion 110 of program then stops execution 136 and returns to the idle state.

Figure 5:
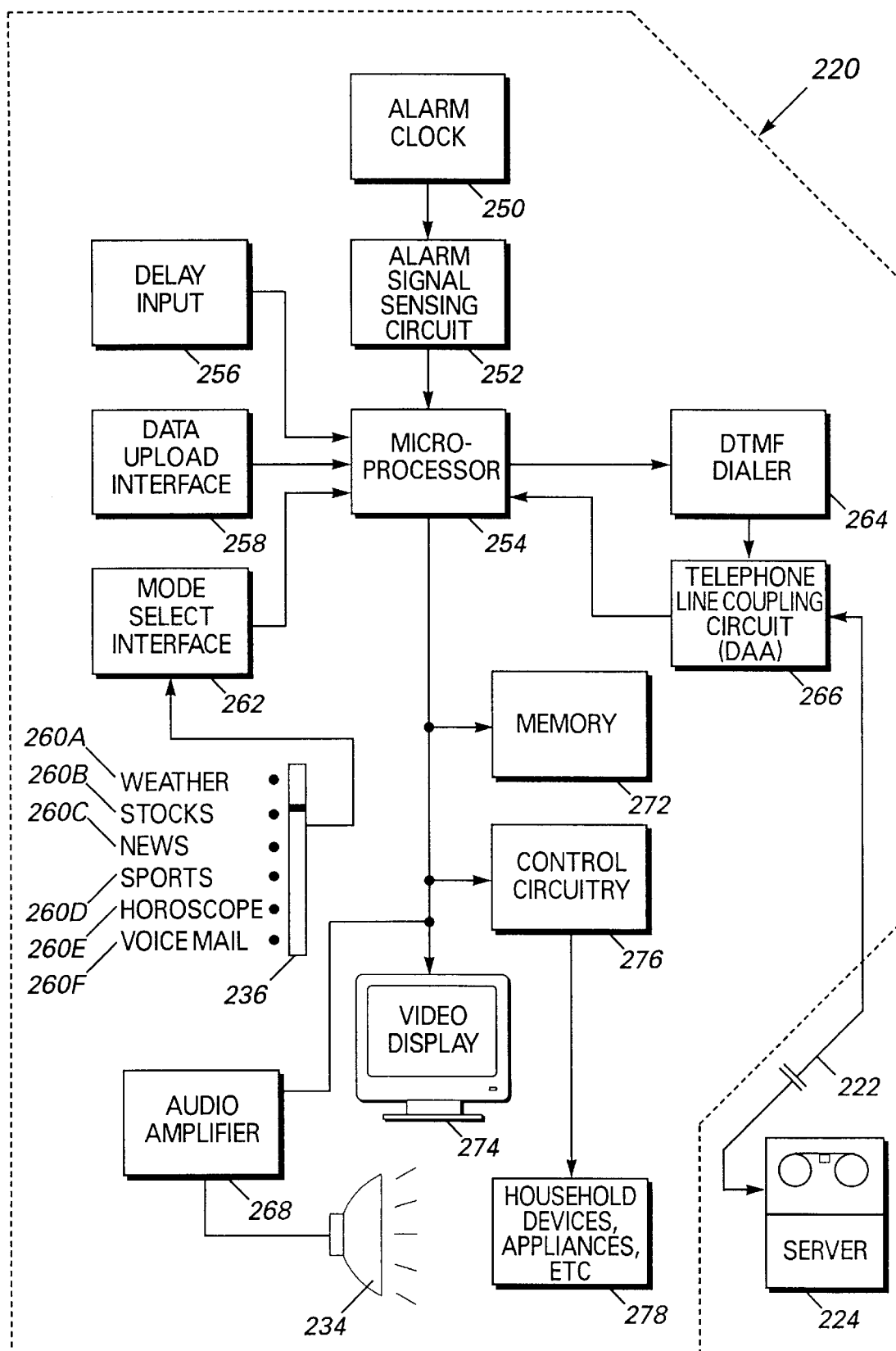
FIG. 5 is a block diagram of a second embodiment of the present invention.

An alternative embodiment of the present invention is shown in FIG. 5 in which an apparatus 220 comprises a microprocessor 254, an alarm clock 250, an alarm signal sensing circuit 252, a delay input 256, a data upload interface 258, a DTMF dialer 264, a telephone line coupling circuit 266, a mode select interface 262 and a mode select switch 236 (having a plurality of states 260A–F), as in the embodiment described above.

In addition to these elements, this embodiment also includes a memory 272 (such as a RAM or magnetic memory) used to store the message (which may be in the form of digital data) received from a server 224 via a telephone line 222. In this embodiment, upon the user depressing the snooze bar, thereby activating the delay input 256, either the microprocessor 254 awaits the receipt of a new alarm signal from the alarm signal sensing circuit 252 or the microprocessor 254 internally counts down the predetermined period of the delay. Once the delay period has expired, rather than causing the DTMF dialer 264 to redial the number, the microprocessor 254 simply plays back the message from memory through the audio amplifier 268 and the speaker 234. (As would be obvious to one skilled in the art, if the message were in the form of digital data, the audio amplifier 268 would comprise a digital-to-analog converter of any standard design.)

This embodiment could also comprise a video display 274, such as a standard computer terminal. With such a configuration, if the user were to put the mode select switch 236 in the state corresponding to "news" 260C, the server could download the text, or other data, of a newspaper that the user would be able to read once awake. Similarly, the user could put the mode select switch 236 in the state corresponding to "stocks" 260B and have a select group of stock quotes downloaded upon the sensing of the alarm signal from the alarm sensing circuit 252.

This embodiment could also comprise control circuitry 276 connected to mechanical devices 278 such as household appliances. For example, the control circuitry 276 could be connected to a plurality of motors that control the position of window blinds. If the data from the server 224 indicates that the weather in the user's region has been forecast to be sunny, the control circuitry 276 could activate the motor to shut the blinds on the south side of the user's house, fully open the blinds on the north side and partially open the blinds on the other sides. Conversely, if rain has been forecast, the control circuitry 276 could cause all blinds to be fully opened. As would be obvious to one skilled in the art, many other control applications based on information received from the server 224 are possible with this embodiment.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. An apparatus for transferring information received from a server that is operationally coupled to a telephone line, comprising:

a. means for generating an alarm signal at a selected time;

b. means, responsive to the alarm signal and operatively coupled to the telephone line, for transmitting selected information to the server;

c. means for selecting a set of data for sending by the server from a plurality of sets of data based upon the information transmitted to the server;

d. a microprocessor having a digital memory, operatively coupled to the telephone line, that stores the set of data received from the server;

e. a device that is operatively coupled to and receives operational instructions from the microprocessor based on the set of data received from the server, comprising f. a switch, having a first state and a second state, responsive to the operational instructions from the microprocessor; and g. a motor, operatively coupled to the switch, that is active when the switch is in the first state and is inactive when the switch is in the second state, wherein the motor operates the positioning of window blinds.

2. The apparatus of claim 1, further comprising means for presenting the set of data to a user.

3. An apparatus for presenting a message received from a server that is operationally coupled to a telephone line, comprising;

a. means for selecting a time at which an alarm signal is to be activated;

b. an alarm clock that generates the alarm signal at the selected time;

c. a DTMF telephone dialer circuit, operationally coupled to the telephone line, that dials a selected telephone number upon sensing the alarm signal, thereby creating a connection on the telephone line;

d. a remote server having a plurality of stored messages;

e. a switch, disposed on the alarm clock, having a plurality of user-selectable states, each state corresponding to a type of message that a user would desire to have played upon the generation of the alarm signal;

f. an information transfer circuit that transfers a selected state from the switch to the telephone line in a format compatible with the server, thereby requesting the server to play a message of a selected type from a plurality of stored messages;

g. an audio amplifier, operationally coupled to the telephone line, that generates an amplified signal corresponding to the message received from the server;

h. a speaker, operationally coupled to the audio amplifier, that generates sound corresponding to the amplified signal, thereby playing the message to the user; and i. means for delaying the playing of the message for a predetermined period upon the receipt of a delay input from a user, comprising;

i. means for generating the delay input;

ii. a disconnect circuit, responsive to the delay input, that causes the telephone dialer circuit to disconnect the connection on the telephone line; and iii. a timing circuit that causes the alarm signal generating means to generate an alarm signal after a predetermined period has passed since the generation of the delay input, wherein the delay input generating means comprises a snooze bar on an alarm clock.

4. An apparatus for transferring information received from a server that is operationally coupled to a telephone line, comprising:

a. means for generating an alarm signal at a selected time;

b. means, responsive to the alarm signal and operatively coupled to the telephone line, for transmitting selected information to the server, comprising;

i. a memory that stores the selected information;

ii. a telephone dialer circuit, operationally coupled to the telephone line, that dials a selected telephone number upon sensing the alarm signal; and iii. an information transfer circuit that reads the selected information from the memory and transfers the selected information to the telephone in a format compatible with the server;

c. means for selecting a message for sending by the server from a plurality of messages based upon the information transmitted to the server;

d. means, operatively coupled to the telephone line, for presenting to the user the selected message received from the server; and e. means for delaying the presenting of the message for a predetermined period upon the receipt of a delay input from the user, comprising;

i. means for generating the delay input;

ii. a disconnect circuit, responsive to the delay input, that causes the telephone dialer circuit to disconnect the connection on the telephone line; and iii. a timing circuit that causes the alarm signal generating means to generate an alarm signal after a predetermined period has passed since the generation of the delay input, wherein the delay input generating means comprises a snooze bar of an alarm clock.

5. The apparatus of claim 4, wherein the alarm signal generating means comprises a digital alarm clock that generates the alarm signal at the selected time.

6. The apparatus of claim 4, wherein the information transmitted to the server includes the telephone number of the server.

7. The apparatus of claim 4, wherein the alarm signal generating means comprises an analog alarm clock that generates the alarm signal at the selected time.

8. The apparatus of claim 4, wherein the alarm signal generating means comprises a microprocessor programmed to monitor time and generate the alarm signal at the selected time.

9. The apparatus of claim 4, wherein the presenting means comprises:

a. an audio amplifier that receives the selected message from the server and generates an amplified signal corresponding to the message; and b. a speaker, operationally coupled to the audio amplifier, that generates sound corresponding to the amplified signal, thereby playing the selected message to the user.

10. The apparatus of claim 4, further comprising means for inputting the selected information to the memory.

11. The apparatus of claim 10, wherein the inputting means comprises a manual switch having a plurality of states, each state corresponding to a type of message that the user would desire to have presented upon the generation of the alarm signal.

12. The apparatus of claim 10, wherein the inputting means comprises an electronic switch having a plurality of user-selectable states, each state corresponding to a type of message that the user would desire to have presented upon the generation of the alarm signal.

13. The apparatus of claim 4, wherein the telephone dialer circuit comprises a DTMF dialer.

14. The apparatus of claim 4, wherein the information transfer circuit comprises a microprocessor programmed to read the memory and transfer data from the memory to the telephone line.

15. The apparatus of claim 4, wherein the selecting means comprises a computer programmed to retrieve a selected message from a memory in response to the information transmitted to the server.

16. The apparatus of claim 4, wherein the presenting means comprises a display device.

17. The apparatus of claim 16, wherein the display device comprises a video terminal.

18. A method of presenting a selected message from a server on an alarm clock, having an associated output device, connectable to the server by a telephone line, comprising the steps of:

a. setting the alarm clock to generate an alarm signal at a selected time;
b. selecting a message to be presented upon activation of the alarm signal;
c. dialing the server when the alarm signal is generated by the alarm clock;
d. transmitting selected information over the telephone line to the server;
e. transmitting the selected message from the server to the alarm clock over the telephone line based on the selected information transmitted to the server;
f. presenting the selected message over the output device;
g. inputting a delay signal to the alarm clock by pressing a snooze bar of the alarm clock; and
h. delaying the playing of the message for a predetermined period upon the alarm clock receiving the delay signal.

19. The method of claim 18, further comprising the step of choosing the message based on the selected information transmitted to the server and the geographic location of the alarm clock.

20. The method of claim 18, wherein the selected information includes a telephone number, so that the telephone number dialed in the dialing step affects selection of the message transmitted.

21. The method of claim 18, further comprising the step of choosing the message based on the geographic location of the alarm clock.

22. The method of claim 18, further comprising the step of choosing the message based on the selected information transmitted to the server.

* * * * *